United States Patent
Wismeth et al.

(10) Patent No.: US 6,729,742 B2
(45) Date of Patent: May 4, 2004

(54) SOLAR LAMP FOR OUTDOOR USE

(76) Inventors: Wofgang Wismeth, Hans-Vogel-Strasse 22, Fürth (DE), 90765; Gerhard Lutz, Hermann-Kolb-Strasse 51, Nürnberg (DE), 90473; Werner Kohlmann, Am Kriegerdenkmal 13, Nürnberg (DE), 90427

(*) Notice: Subject to any disclaimer, the term of this patent is extended or adjusted under 35 U.S.C. 154(b) by 0 days.

(21) Appl. No.: 10/142,464

(22) Filed: May 10, 2002

(65) Prior Publication Data

US 2002/0176248 A1 Nov. 28, 2002

Related U.S. Application Data

(63) Continuation of application No. PCT/DE00/03948, filed on Nov. 10, 2000.

(30) Foreign Application Priority Data

Nov. 12, 1999 (DE) ........................... 299 19 948 U

(51) Int. Cl.$^7$ ................................. F21L 13/00
(52) U.S. Cl. ................. 362/183; 362/153.1; 362/431; 136/206
(58) Field of Search .................. 362/153.1, 431, 362/183, 414, 367, 800; 323/906; 136/206

(56) References Cited

U.S. PATENT DOCUMENTS 4,816,970 A * 3/1989 Garcia, Jr. ................ 362/183
5,984,570 A * 11/1999 Parashar ..................... 40/565

FOREIGN PATENT DOCUMENTS

| DE | 8521579.1 | * | 9/1985 |
| DE | 85 21 579.1 | | 10/1985 |
| DE | 39 38 251.6 | | 5/1991 |
| DE | 91 04 219.4 | | 8/1991 |
| DE | 93 04 947.1 | | 7/1993 |
| DE | 298 08 876 U1 | | 10/1998 |
| DE | 298 12 152 U1 | | 10/1998 |

* cited by examiner

*Primary Examiner*—Alan Cariaso
*Assistant Examiner*—Ali Alavi

(57) ABSTRACT

Solar lamp for outdoor use, in particular a garden lamp, road or street lamp or such, consisting of one or more solar module, and a housing with a storage means for electric energy (battery), which is electrically connected to the solar module, and one or more luminous body, whereby between the battery and the luminous body a circuit is provided, which reacts to signals from a light sensor attached to the solar lamp, and which enables or disables the electrical connection between the battery and the luminous body depending on the degree of brightness/darkness, whereby the housing is provided with two or more walls of different orientation which do not converge parallel to each other, and whereby one or more solar modules are arranged on each wall, or that the walls are formed by solar modules.

4 Claims, 1 Drawing Sheet

SOLAR LAMP FOR OUTDOOR USE

CROSS-REFERENCE TO RELATED APPLICATIONS

Figure 1:
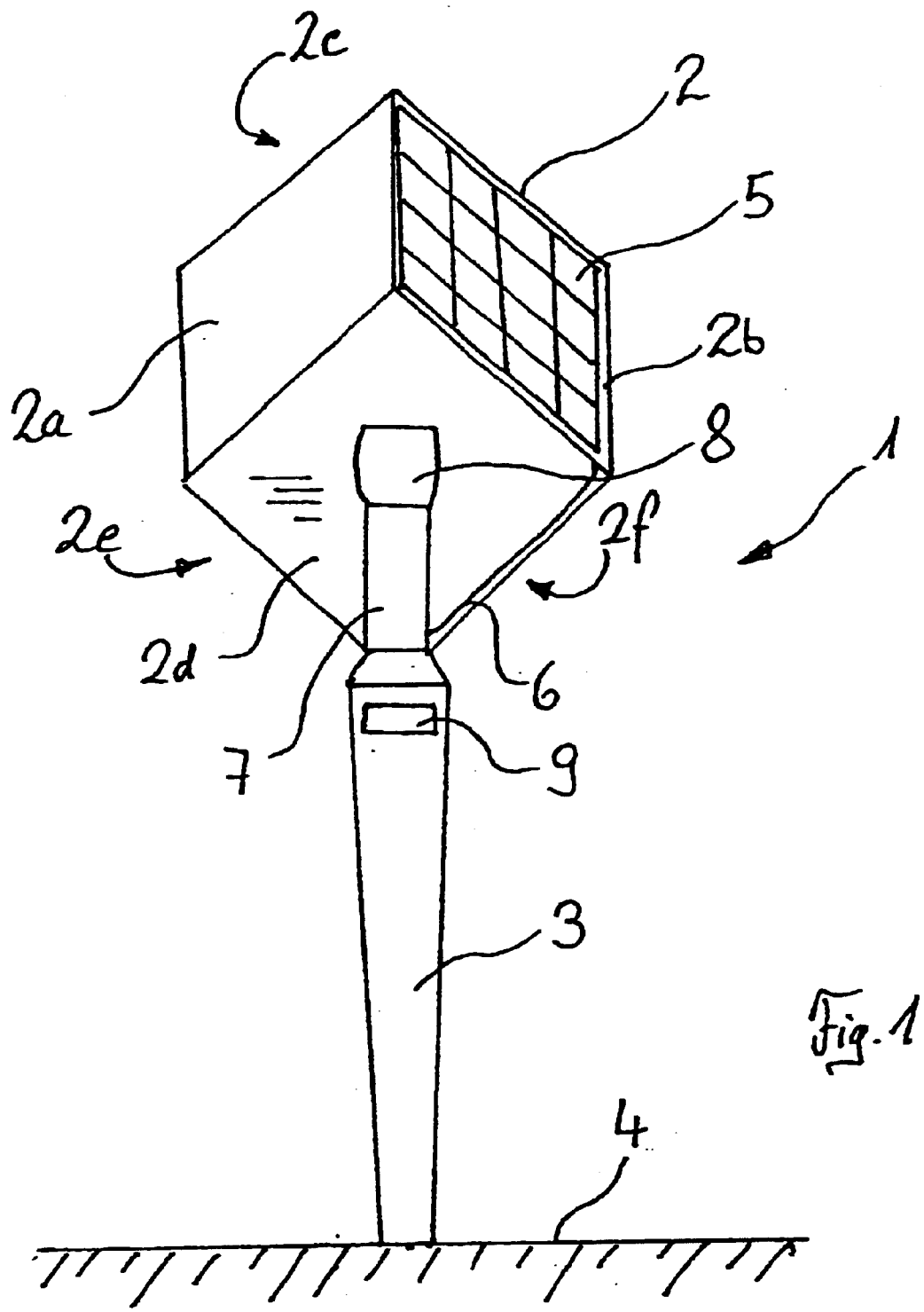

This application is a continuation of PCT/DE00/03948, filed Nov. 10, 2000, which claims priority from German Application No. 299 19 948.7, filed Nov. 12, 1999.

BACKGROUND OF THE INVENTION

1. Field of the Invention

The invention relates to a solar lamp for outdoor use which is in the shape of a cube, which has solar modules in or on two or more top wall surfaces and which is attached to a fastening structure for being supported.

2. Description of the Related Art

Known in prior art are solar lamps for outdoor use, in particular garden lamps, consisting of one or more solar module, and a housing with a storage means for electric energy (battery), which is electrically connected to the solar module, and one or more luminous bodies, whereby between the battery and the luminous body a circuit is provided which reacts to signals from a light sensor attached to the solar lamp and enables or disables the electrical connection between the battery and the luminous body, depending on the degree of brightness/darkness. One version, which is marketed under the name of "Pagoda"["Pagode"], consists of a post to be inserted into the ground, which on the top is provided with a cylindrical housing into which the luminous body, battery, circuit and sensors are integrated and which is covered by a disc-shaped horizontal solar module. Another version called "Solite" is also provided with a disc-shaped upper end with a solar module, but is covered by a transparent dome. It is also known in prior art to design street lamps as solar lamps, whereby in one version, a plate-shaped elongated solar module itself serves as the largest component of the post. Other solutions have lines of lamps leading to external solar modules, since the power of the modules arranged on the plate-shaped ends of the garden lamps is inadequate since—for design reasons and practical considerations—the use of small modules is preferred.

BRIEF SUMMARY OF THE INVENTION

It is the object of the present invention to create a solar lamp, in which energy generation is optimized and which still allows for an aesthetically pleasing design.

This object is achieved with of a cube, which has two or more solar modules in or on two or more tub wall surfaces and which is attached to a fastening structure for being supported.

According to the invention is a solar lamp for outdoor use, in particular a garden lamp, road or street lamp or such, consisting of one or more solar modules, and a housing with a storage means for electric energy (battery), which is electrically connected to the solar module, and one or more luminous bodies, whereby between the battery and the luminous body a circuit is provided, which reacts to signals from a light sensor attached to the solar lamp, and which enables or disables the electrical connection between the battery and the luminous body, depending on the degree of brightness/darkness, characterized in that the housing is provided with at least two walls of different orientation and which do not converge parallel to each other, and that one or more solar modules are arranged on each wall, or that the walls are formed by solar modules.

This basic idea deviates from the "conventional wisdom" about the orientation of solar modules, according to which a southern exposure is suggested to allow a maximum incidence of solar light. Instead, two modules with different orientations are suggested, whereby it is found, however, that the sum of the energy obtained is increased to such an extent that it is possible to achieve a satisfactory illumination with a relatively small lamp design.

Preferably, the housing is a regular body (n-hedron) with at least four wall surfaces. According to a preferred embodiment of the invention, it is a cube arranged so that it stands on an apex on a fastening, whereby the solar modules are arranged on two or more of its upper surfaces or form these surfaces. Preferably, the fastening is arranged in the region of the lower apex of the cube, and it may form either a vertical post or a horizontal arm.

According to a special embodiment of the invention, there is also a motion sensor connected with electrical control means, whereby the luminous body is provided with two or more controllable brightness levels, and the higher brightness level is turned on in reaction to a signal of the motion sensor, whereby a timer is provided which limits this on period.

According to an advantageous embodiment of the invention, the luminous body consists of a plurality of light emitting diodes (LEDs).

The invention is described in detail below, using an example, and with reference to the accompanying drawing figure.

BRIEF DESCRIPTION OF THE VIEW OF THE DRAWING

FIG. 1 is an elevational view of the solar lamp of the present invention.

DETAILED DESCRIPTION OF THE INVENTION

FIG. 1 shows a solar lamp 1, consisting of a cubic housing 2 and a pole 3. A lower apex of cubic housing 2 sits on the upper end of pole 3 where it is fastened to same. Pole 3 is inserted in conventional fashion in the ground 4, for example in the earth. This renders the configuration of cubic housing 2 such that three wall surfaces 2a, 2b, 2c are slanted toward the top, while the other three wall surfaces 2a, 2b, 2c are slanted toward the bottom. The upper surfaces 2a, 2b, 2c are formed by solar modules 5, of which only that of module 5 is indicated here. The solar modules are glass plates with series-connected solar cells and a frame, whereby the modules are connected to their frames in such a way that they produce a cubic shape. The lower wall surfaces 2d, 2e, 2f are transparent and can be formed, for example, by equal glass plates which have no solar cells and are provided with frames, by which they are connected to each other and to the solar modules. The solar modules are provided with connections from which cables 6 lead to a module 7 in the interior of housing 2, which is provided with the above described circuits and the battery. A luminous body 8 is arranged on module 7. A sensor 9 for light and motion is arranged in pole 3, from which the corresponding line runs to module 7. When all the upper surfaces 2a, 2b, 2c are formed by solar modules, or when they carry solar modules, the cubic shape of housing 2 ensures that an optimal use of solar energy is always guaranteed without the owner having to worry about the orientation of the solar modules.

What is claimed is:

1. Solar lamp for outdoor use, in particular a garden lamp, road or street lamp, comprising one or more solar modules, and a housing with a battery, which is electrically connected to the at least one solar module, and one or more luminous bodies, a circuit being provided between the battery and the luminous body which reacts to signals from a light sensor attached to the solar lamp and which enables or disables the electrical connection between the battery and the at least one luminous body, depending on the degree of brightness/darkness, characterized in that the housing is a cube with six wall surfaces, that one or more solar modules (5) are arranged on at least two wall surfaces of the cube, or that at least two wall surfaces of the cube are formed by solar modules themselves, that the cube stands on its apex the cube is attached to a fastening structure for supporting the cube above the floor or ground and the fastening structure is attached to the cube in the area of the lower apex of the cube, and that the solar modules (5) are arranged on two or more top surfaces (2a, 2b, 2c) of the cube or the solar modules (5) and form the at least two wall surfaces of the cube.

2. Solar lamp according to claim 1, characterized in that the fastening structure for the cube comprises one of a vertical pole (3) or a horizontal arm.

3. Solar lamp according to claim 1, characterized by comprising:

a motion sensor which is connected to electrical control means, the luminous body having two or more controllable brightness levels, and the higher brightness level is turned on in reaction to a signal from the motion sensor, and a timer is provided which limits the period that the higher brightness level is turned on.

4. Solar lamp according to claim 1, characterized in that the luminous body comprises a plurality of light emitting diodes (LED's).

* * * * *